(12) United States Patent
Kocsis et al.

(10) Patent No.: US 8,326,868 B2
(45) Date of Patent: Dec. 4, 2012

(54) WEB-ENABLED DATABASE ACCESS TOOLS

(75) Inventors: Zoltan Kocsis, Woodstock, GA (US); Eric Manikowski, Atlanta, GA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 532 days.

(21) Appl. No.: 12/368,466

(22) Filed: Feb. 10, 2009

(65) Prior Publication Data
US 2010/0205217 A1   Aug. 12, 2010

(51) Int. Cl.
*G06F 7/00* (2006.01)
(52) U.S. Cl. ........ 707/771; 707/782; 707/783; 707/784; 707/785; 707/800
(58) Field of Classification Search .................. None
See application file for complete search history.

(56) References Cited

U.S. PATENT DOCUMENTS

| | | | |
|---|---|---|---|
| 6,366,915 B1 * | 4/2002 | Rubert et al. | 707/770 |
| 7,051,020 B2 * | 5/2006 | Dettinger et al. | 1/1 |
| 2008/0208866 A1 * | 8/2008 | Bhattacharjee et al. | 707/9 |

* cited by examiner

*Primary Examiner* — Debbie Le
*Assistant Examiner* — Anh Tai Tran
(74) *Attorney, Agent, or Firm* — Hope Baldauff Hartman, LLC

(57) ABSTRACT

This description provides tools and techniques for Web-enabled database access tools. These tools may provide systems that include database access tools that provide at least one level of abstraction between external databases and users of the access tools. The systems may also include one or more internal databases maintained by the tool, with the internal database storing respective login information associated with the users. The login information may enable the users to access the tool without providing direct access to the external databases.

8 Claims, 8 Drawing Sheets

WEB-ENABLED DATABASE ACCESS TOOLS

BACKGROUND

A variety of databases and related management systems are available commercially from a number of different vendors. In conventional scenarios, enterprises may provide at least some of their users with access to at least some of these databases. However, these conventional scenarios may raise a variety of administrative issues. For example, accessing databases provided by different vendors may involve using specific tools, training, and protocols specific or particular to those databases. Maintaining privilege and permissions information appropriate for the different users may be challenging, from a management perspective. In addition, different personnel may be specifically trained on one database, but may not be specifically trained on other databases, limiting their ability to access or support the different databases within the enterprise.

SUMMARY

It should be appreciated that this Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

This description provides tools and techniques for Web-enabled database access tools. These tools may provide systems that include database access tools that provide at least one level of abstraction between external databases and users of the access tools. The systems may also include one or more internal databases maintained by the tool, with the internal database storing respective login information associated with the users. The login information may enable the users to access the tool without providing direct access to the external databases.

Other apparatus, systems, methods, and/or computer program products according to embodiments will be or become apparent to one with skill in the art upon reviewing the following drawings and Detailed Description. It is intended that all such additional apparatus, systems, methods, and/or computer program products be included within this description, be within the scope of the claimed subject matter, and be protected by the accompanying claims.

DETAILED DESCRIPTION

The following detailed description is directed to methods, systems, and computer-readable media for web-enabled database access tools. While the subject matter described herein is presented in the general context of program modules that execute in conjunction with the execution of an operating system and application programs on a computer system, those skilled in the art will recognize that other implementations may be performed in combination with other types of program modules.

Generally, program modules include routines, programs, components, data structures, and other types of structures that perform particular tasks or implement particular abstract data types. Moreover, those skilled in the art will appreciate that the subject matter described herein may be practiced with other computer system configurations, including hand-held devices, multiprocessor systems, microprocessor-based or programmable consumer electronics, minicomputers, mainframe computers, and the like.

Figure 1:
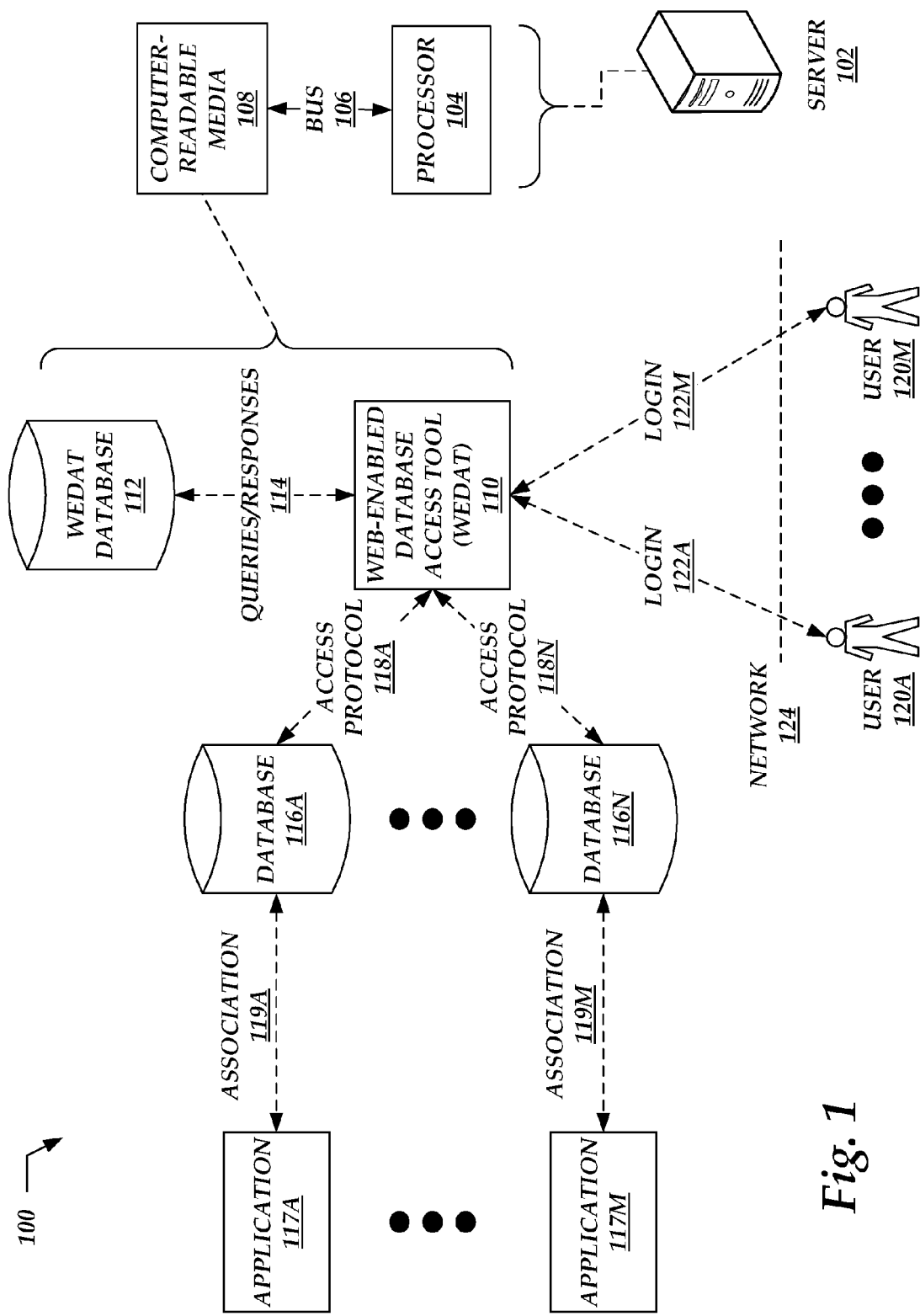
FIG. 1 is a block diagram illustrating systems or operating environments for implementing web-enabled database access tools and related databases, according to exemplary embodiments.

FIG. 1 illustrates systems or operating environments, denoted generally at 100, for web-enabled database access tools, abbreviated as "WEDAT". These systems 100 may include any number of servers, workstations, or other computing systems denoted generally as servers 102.

Turning to the servers 102 in more detail, this server may include one or more processors 104, which may have a particular type or architecture, chosen as appropriate for particular implementations. The processors 104 may couple to one or more bus systems 106 chosen for compatibility with the processors 104.

The servers 102 may also include one or more instances of computer-readable storage media 108, which couple to the bus systems 106. The bus systems 106 may enable the processors 104 to read code and/or data to/from the computer-readable storage media 108. The media 108 may represent storage elements implemented using any suitable technology, including but not limited to semiconductors, magnetic materials, optics, or the like. The media 108 may include memory components, whether classified as RAM, ROM, flash, or other types, and may also represent hard disk drives.

The storage media 108 may include one or more modules of instructions that, when loaded into the processor 104 and executed, cause the servers 102 to perform various techniques related to operating the web-enabled database access tools. As detailed throughout this description, these modules of instructions may also provide various tools or techniques by which the servers 102 may provide the web-enabled database access tools, using the components, flows, and data structures described in more detail throughout this description. For example, the storage media 108 may include one or more software modules that provide web-enabled database access tools (WEDAT), denoted generally at 110. In addition, the storage media may also include any number of data storage structures accessible to the WEDAT 110. For example, the WEDAT 110 may cooperate with an internal database 112 to store and retrieve various data as described herein, as represented generally by queries and responses 114.

The WEDAT 110 may serve as a broker or intermediary between any number of different databases, with FIG. 1 illustrating two examples of these databases at 116*a* and 116*n* (collectively, databases 116). The databases 116 may or may not reside on the same physical hardware (e.g., the server 102) as the WEDAT 110, and in some cases the databases 116 may be geographically separated from the server 102. The databases 116 may thus be considered "external," as compared to the database 112 maintained internally by the WEDAT 110.

The WEDAT 110 may interact with the databases 116*a* and 116*n* through appropriate database access protocols, denoted respectively at 118*a* and 118*n* (collectively, access protocols 118). In different possible implementation scenarios, the databases 116*a* and 116*n* may be provided by different vendors, with the corresponding access protocols 118*a* and 118*n* varying accordingly. For example, the access protocols 118 may define procedures for logging into and authenticating to the databases 116. The access protocols 118 may also define procedures for querying the databases 116, modifying records or tables within the databases 116, defining indexes, and the like.

The databases 116 may support any number of different applications, with FIG. 1 providing examples of such applications at 117*a* and 117*m* (collectively, applications 117). FIG. 1 denotes at 119*a* and 119*m* associations between the databases 116 and the applications 117 supported by those databases. Without limiting possible implementations, examples of applications 117 may include point-of-sale (POS) applications, accounting applications, interactive voice response (IVR) applications, and the like. Generally, but not necessarily, databases supporting a given application may be similar, whether provided by different vendors, or whether supporting development, quality assurance (QA), pre-production, or production functions.

Figure 2:
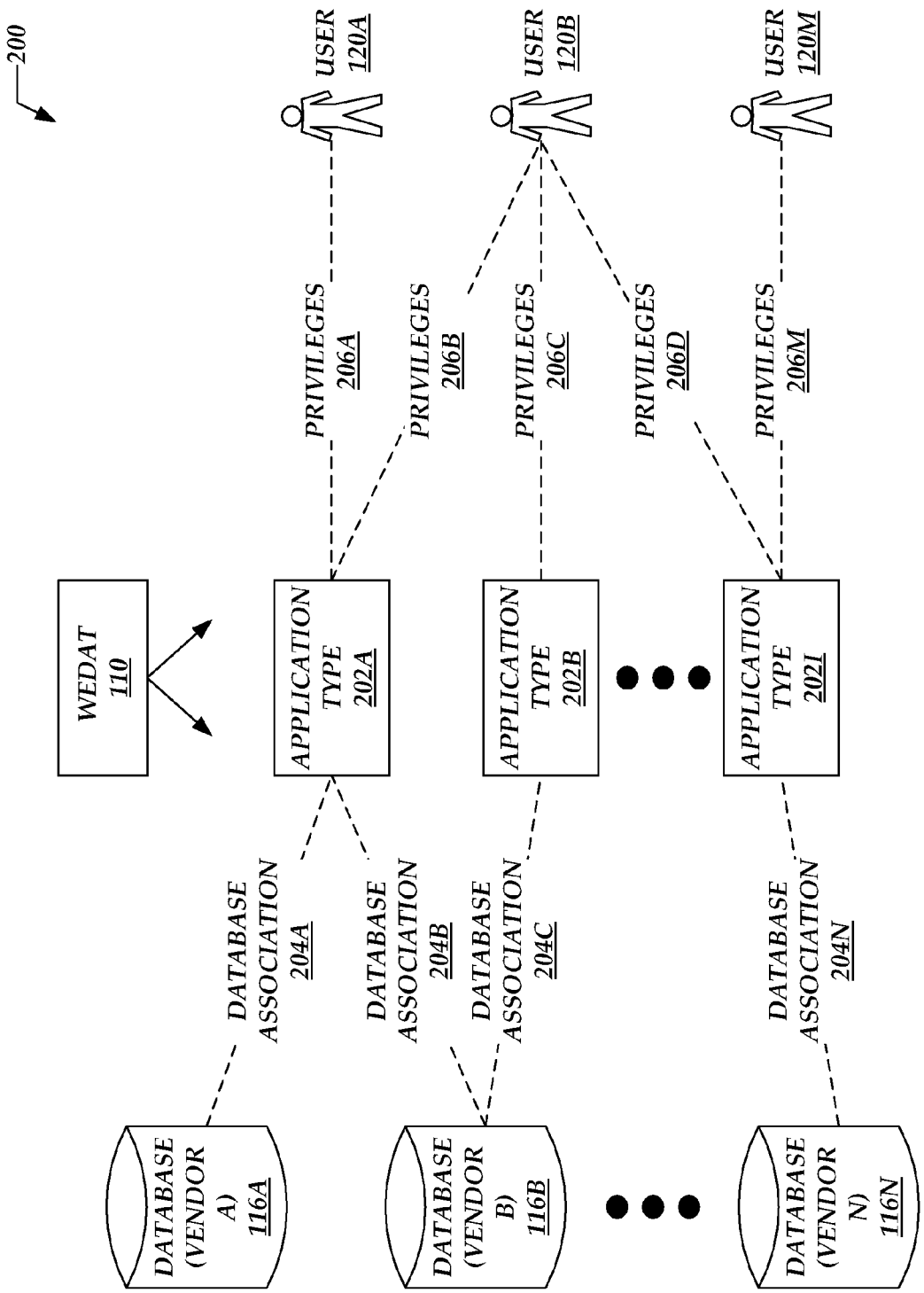
FIG. 2 is a block diagram illustrating components and data flows by which a given web-enabled database access tool may define application types, associate these application types with respective databases, and expose these application types to different users, according to exemplary embodiments.

As described in further detail in FIG. 2, the WEDAT 110 may abstract the applications 117 into application types, and may expose these application types to users 120*a* and 120*m* (collectively, users 120). For example, rather than the user directing a query directly to a database supporting a POS application, the user would direct the query to an application type associated with POS applications.

Turning to the users 120, the WEDAT 110 may enable any number of users 120*a* and 120*m* to login to the WEDAT, as represented generally at 122*a* and 122*m* (collectively, logins 122). These logins 122 may represent respective username/password combinations assigned to different users 120. However, other authentication mechanisms may be suitable in different implementations, with username/password scenarios provided as a non-limiting example.

As described in further detail below, the WEDAT 110 may enable the users 120 access functionality provided by the databases 116, while also providing one or more levels of abstraction between the databases 116 and the users 120. More specifically, the WEDAT 110 may shield or isolate the users 120 from the details of interacting with the databases 116. Similarly, the WEDAT 110 may shield or isolate the details of databases 116 from the users 120. For example, the logins 122 may represent logins into the WEDAT 110, as distinguished from logins into the particular databases 116. Put differently, the users 120 may login to the WEDAT 110 and access the databases 116 indirectly through the WEDAT 110, rather than logging directly into the databases 116.

In implementation scenarios, the users 120 may be geographically separated from each other, and may also be geographically separated from the servers 102 and the physical locations of the databases 116. In these scenarios, the users 120 may interact with the WEDAT 110 by communicating over one or more intermediate networks 124, which generally represent any protocols, adapters, components, and other general infrastructure associated with wired and/or wireless communications networks. Such networks 124 may be global, regional, local, and/or personal in scope and nature, as appropriate in different implementations, and may be configured as appropriate to transmit voice and/or data. More specifically, the users 120 may access the capabilities of the WEDAT 110 through a web browser interface. Thus, the WEDAT 110 is referred to as a "web-enabled" database access tool, which is operable over a wide area communications network (e.g., the Internet). In these scenarios, the users 120 may access the WEDAT 110 (and indirectly the databases 116) from any place where they can access the Internet.

The WEDAT 110 may serve as an intermediary or broker between the users 120 and the databases 116. In this manner, the WEDAT 110 may provide centralized management for the databases 116, with the databases not being exposed directly to the users 120.

Having described the overall operating environments or systems 100 in FIG. 1, the discussion now turns to a more detailed description of application types. This description is now provided with FIG. 2.

FIG. 2 illustrates components and data flows, denoted generally at 200, by which a web-enabled database access tool may define application types, associate these application types with respective databases, and expose these application types to different users. For convenience of description, but not to limit possible implementations, FIG. 2 may carry forward some items introduced in previous drawings, and may refer to such items by identical reference numbers. For example, FIG. 2 carries forward representations of the WEDAT 110 and representative users 120*a*, 120*b*, and 120*m*. FIG. 2 also carries forward examples of databases 116*a*, 116*b*, and 116*n*.

In the example shown in FIG. 2, the database 116*a* is assumed to be provided by a first vendor (A), the database 116*b* is assumed to be provided by another vendor (B), and the database 116*n* is assumed to be provided by another vendor (N). Rather than exposing the individual databases 116*a*-116*n* to the users 120, the WEDAT 110 may define application types 202*a*, 202*b*, and 202*i* (collectively, application types 202) that provide a layer or level of abstraction between the databases 116 and the users 120.

In some cases, the WEDAT 110 may use the application types 202 to group applications (e.g., 117 in FIG. 1) together, abstracting from the level of particular applications to more generic application types. For example, a given user 120 may typically interact with one or more applications 117 to perform some task or operation. The WEDAT 110 may abstract these applications to an application type 202 associated with the task or operation, and then expose this application type to the users 120. In turn, the users 120 interact with the application types 202, but do not interact directly with the databases 116 and/or the individual applications 117.

In previous techniques, users would typically interact with different databases 116 using particular skills or tools. However, the application types 202 may shield the users from the specifics or details of different particular databases 116, thereby enabling the users to access the data stored within the databases 116 without acquiring the training, skills, or tools otherwise involved with accessing these databases. Instead, the users may interact with the application types 202.

The WEDAT 110 may enable users to interact with appropriate application types 202, rather than the users directly querying the databases 116. As shown in FIG. 2, the WEDAT 110 may define associations between application types 202 and databases 116. For example, the application type 202*a* may be associated with the databases 116*a* and 116*b*, as represented at 204*a* and 204*b*. The application type 202*b* may be associated with the database 116*b*, as represented at 204*c*, while the application type 202*i* may be associated with the database 116*n*, as represented at 204*n*. In this manner, the WEDAT 110 may match the users 120 with the appropriate databases 116, operating through the application types 202.

The WEDAT 110 may, through the application types 202 exposed to users, provide a standardized interface to enable users 120 of different skill levels to access the databases 116. In addition, the application types 202 may enable the users 120 to access a variety of different databases 116 using the same general syntax and set of tools. The application types 202 may isolate the users 120 from any vendor-specific syntax or database access tools, in favor of the standardized interface presented by the WEDAT 110. The WEDAT 110 may map or convert queries provided by the different users 120 into the syntax or tool format appropriate for the different databases 116 that are responsive to these queries.

The WEDAT 110 may also associate privilege information with various users, with this privilege information indicating which application types are permitted to different users, as well as indicating types of activities permitted to those users. In the example shown in FIG. 2, the user 120*a* is permitted to access the application type 202*a*, as indicated at 206*a*. The user 120*b* is permitted to access the application types 202*a*, 202*b*, and 202*i*, as indicated respectively at 206*b*, 206*c*, and 206*d*. The user 120*m* is permitted to access the application type 202*i*, as indicated at 206*m*.

The different instances of the privilege information 206*a*-206*m* are denoted collectively as privilege information 206. In different implementation scenarios, the privilege information 206 may enable different users 120 to perform different activities through the application types 202. Examples of these activities may include displaying, updating, deleting tables or other structures within the databases. In some cases, the privilege information 206 may permit users to review the internal structure of particular databases, as well as reviewing primary keys, foreign keys, relationships between different databases. The privilege information 206 may also permit users to access and review metadata associated with different databases 116.

Having described the application types 202 in FIG. 2, the discussion now turns to a description of how the WEDAT 110 may enable users performing different roles to access different databases to perform various functions. This description is now provided with FIG. 3.

Figure 3:
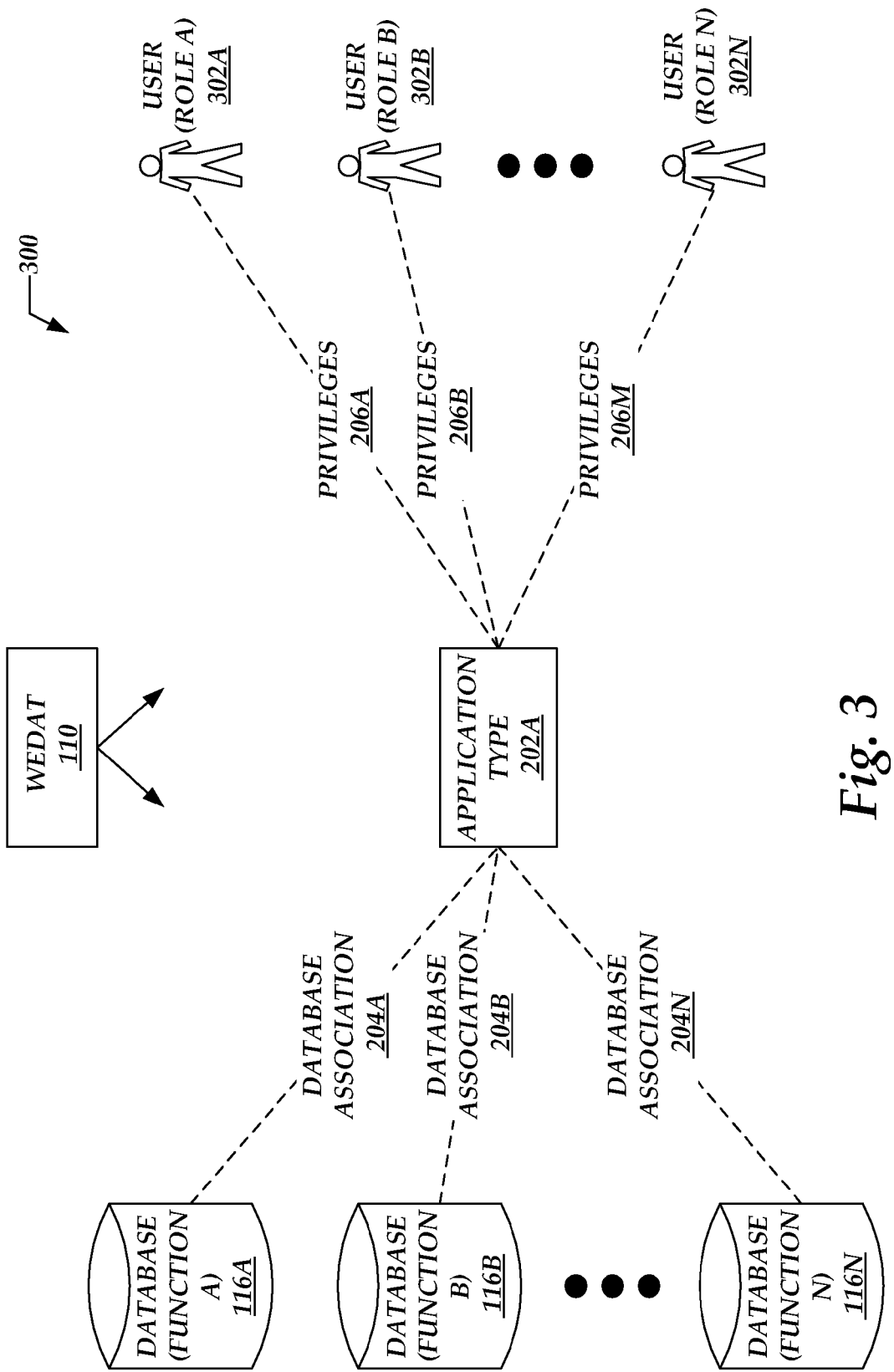
FIG. 3 is a block diagram illustrating components and data flows by which the Web-enabled database access tool may enable users performing different roles to access different databases to perform various functions, according to exemplary embodiments.

FIG. 3 illustrates components and data flows, denoted generally at 300, by which the WEDAT may enable users performing different roles to access different databases to perform various functions, according to exemplary embodiments. For convenience of description, but not to limit possible implementations, FIG. 3 may carry forward some items introduced in previous drawings, and may refer to such items by identical reference numbers. For example, FIG. 3 carries forward representations of the WEDAT 110. FIG. 3 also carries forward examples of databases 116*a*, 116*b*, and 116*n*, as well as related database associations 204*a*-204*n* and privilege information 206*a*-206*m*.

Turning to FIG. 3 in more detail, the WEDAT 110 may establish application types (e.g., 202*a*) and may attract with any number of databases to perform different functions. For example, the database 116*a* may perform a first function (A), the database 116*b* may perform another function (B), while the database 116*n* may perform yet another function (N). More specifically, without limiting possible implementations, the database 116*a* may support development activities, the database 116*b* may support testing or quality assurance (QA) activities, the database 116*n* may support pre-production activities, and one or more other databases (not shown) may support production activities.

FIG. 3 carries forward examples of users at 120*a*, 120*b*, and 120*n*. In the example shown, the users 120 may perform different roles, with the WEDAT 110 allocating privileges 206 to the users 120 appropriate to the different roles. For example, the user 120*a* may perform a specific role A, denoted generally at 302*a*. The user 120*b* may perform a specific role B denoted generally at 302*b*, and the user 120*n* may perform a specific role N denoted generally at 302*n*. The roles 302*a*-302*n* may be referred to collectively as roles 302. The WEDAT 110 may analyze the roles 302, and may assign the privileges 206 for accessing the databases 116, depending on which databases are appropriate for performing which roles.

Having described how the WEDAT 110 may enable users performing different roles to access different databases, the discussion now turns to a description of components and process flows by which the WEDAT supports shared queries. This description is now provided with FIG. 4.

Figure 4:
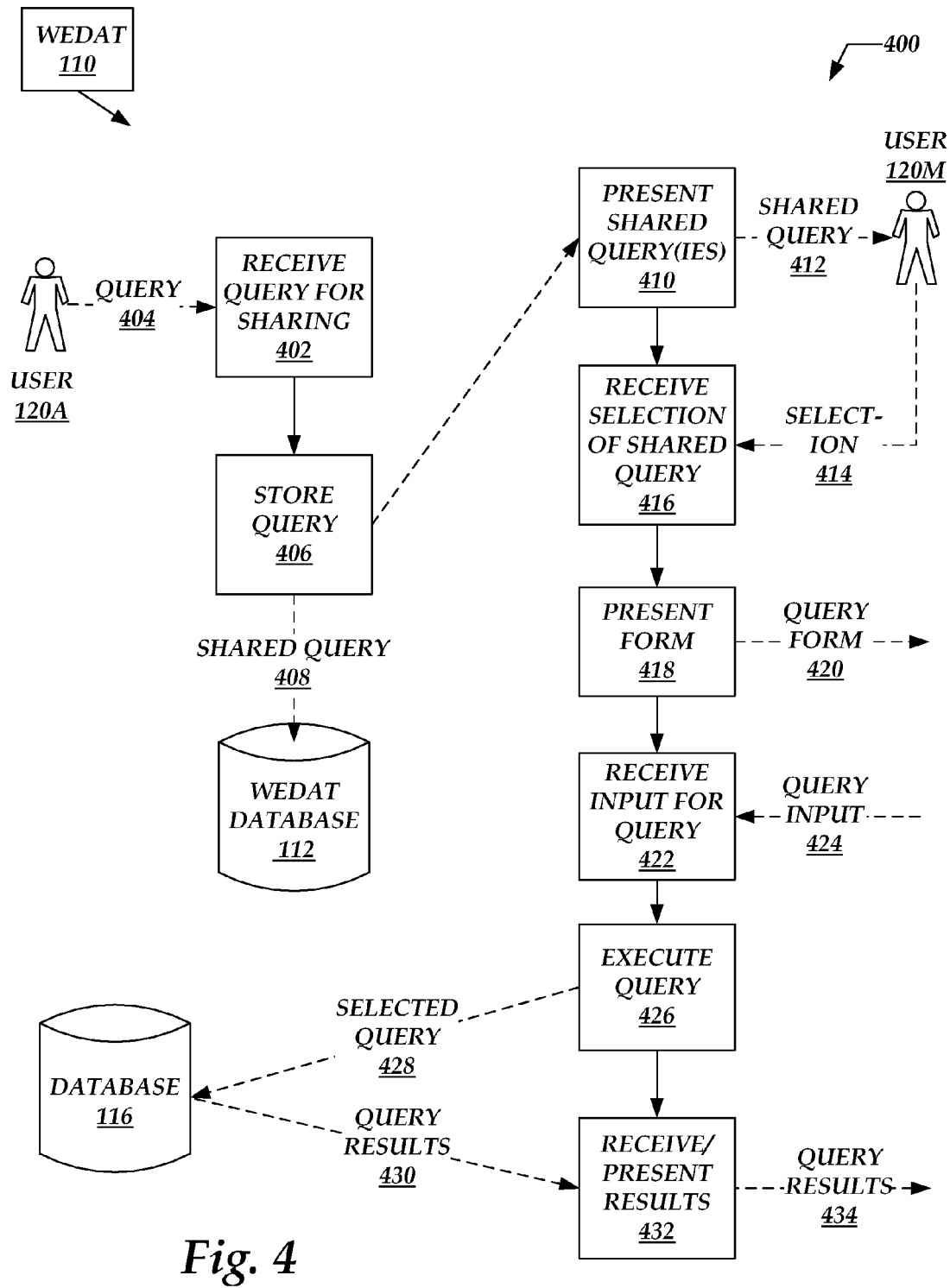
FIG. 4 is a combined block and flow diagram illustrating components and related process flows by which the web-enabled database access tools enable predefined queries to be shared among different users, according to exemplary embodiments.

FIG. 4 illustrates components and related process flows, denoted generally at 400, by which the WEDAT enables predefined queries to be shared among different users. For convenience of description, but not to limit possible implementations, FIG. 4 may carry forward some items introduced in previous drawings, and may refer to such items by identical reference numbers. For example, FIG. 4 carries forward representations of the WEDAT 110 and representative users 120*a* and 120*m*. FIG. 4 also carries forward examples of the WEDAT database 112 and the external database 116.

Turning to the process flows 400 in more detail, block 402 represents receiving at least one query 404 from a user (e.g., 120*a*). In some scenarios, the user 120*a* may be a highly-skilled database user or analyst, with the ability to construct relatively complex queries 404 for use by other users (e.g., 120*m*). As detailed further below, the user 120*a* may use his or her expertise to create queries that, in turn, may be executed by other users 120*m*.

Block 406 represents storing one or more instances of these queries 404, for subsequent sharing with other users. Such queries 404 are referred to herein as "shared queries," as denoted generally at 408. In the example shown in FIG. 4, block 406 may include storing the shared queries 408 in the WEDAT database 112. In some scenarios, different users 120 may repeatedly perform the same queries over time. The shared queries 408 as described herein may enable such users 120 to invoke shared queries, rather than reentering the same query multiple times.

Once one or more shared queries 408 are stored in the WEDAT database 112, block 410 represents providing queries that are available for execution to one or more users (e.g., 120*m*). For example, FIG. 4 denotes representations of these available shared queries at 412, and block 410 may include providing a menu or other suitable user interface (UI) mechanism for presenting shared queries 412 to the users 120*m*.

In some instances, the user 120*m* may select one or more of these shared queries 412, with these selections represented generally at 414. Block 416 represents receiving a selection 414 of one or more shared queries 412. It is noted that, in some cases, the user 120*m* may select a particular shared query without viewing a menu or other UI mechanism listing a plurality of available shared queries. For example, a given user may repeatedly invoke a given shared query without viewing the entire menu of available shared queries.

In some cases, the shared queries 408 or 412 may receive input parameters. For example, without limiting possible implementations, a given shared query may perform some search on a given customer number. Block 418 represents presenting a query form 420 to the user 120*m* to obtain any such input parameters from the user.

Block 422 represents receiving any input parameters for the shared query selected by the user 120*m*. FIG. 4 represents these input parameters at 424. However, it is noted that some queries may operate without input parameters 424, without departing from the scope and spirit of this description.

Block 426 represents executing one or more selected shared queries, based on any input parameters 424 germane to the selected shared query. FIG. 4 denotes at 428 the selected query as run against one or more appropriate databases (e.g., 116), and denotes at 430 the results of running the selected query against the database.

Block 432 represents receiving the query results 430, and may include presenting the results to one or more users 120*m*. FIG. 4 denotes at 434 the query results as presented to these users. In some implementations, the query results 434 may be presented or output as one or more formatted files including comma-separated values (CSVs), which in turn may be imported into spreadsheets, databases, or other similar applications.

In other examples, the query results 434 may include representations of tables, indexes, or other features from given databases, as presented in appropriate browser software. Regarding indexes, more specifically, the query results 434 may indicate whether the indexes are valid, enabling users to review the indexes and address any invalid indexes. The query results 434 may also include any metadata extracted from the databases and displayed to the users.

In some implementations, the query results 434 may be presented on a results screen along with a "resubmit" button. This resubmit button may be responsive to user input to resubmit the same query any number of times. In addition, the results screen may enable the user to specify an "auto-refresh" interval, such that the query is automatically refreshed at the specified interval. In some cases, the automatically-refreshed query may be launched to a new browser window, with the results of the refresh query presented in the new browser window.

It is noted that implementations of the process flows 400 may or may not include all of the components and processes as shown in FIG. 4. Having described the components and related process flows 400 by which the WEDAT may enable shared queries to be run by different users, the discussion now turns to a more detailed description of illustrative structures for the WEDAT database. This description is now provided with FIG. 5.

Figure 5:
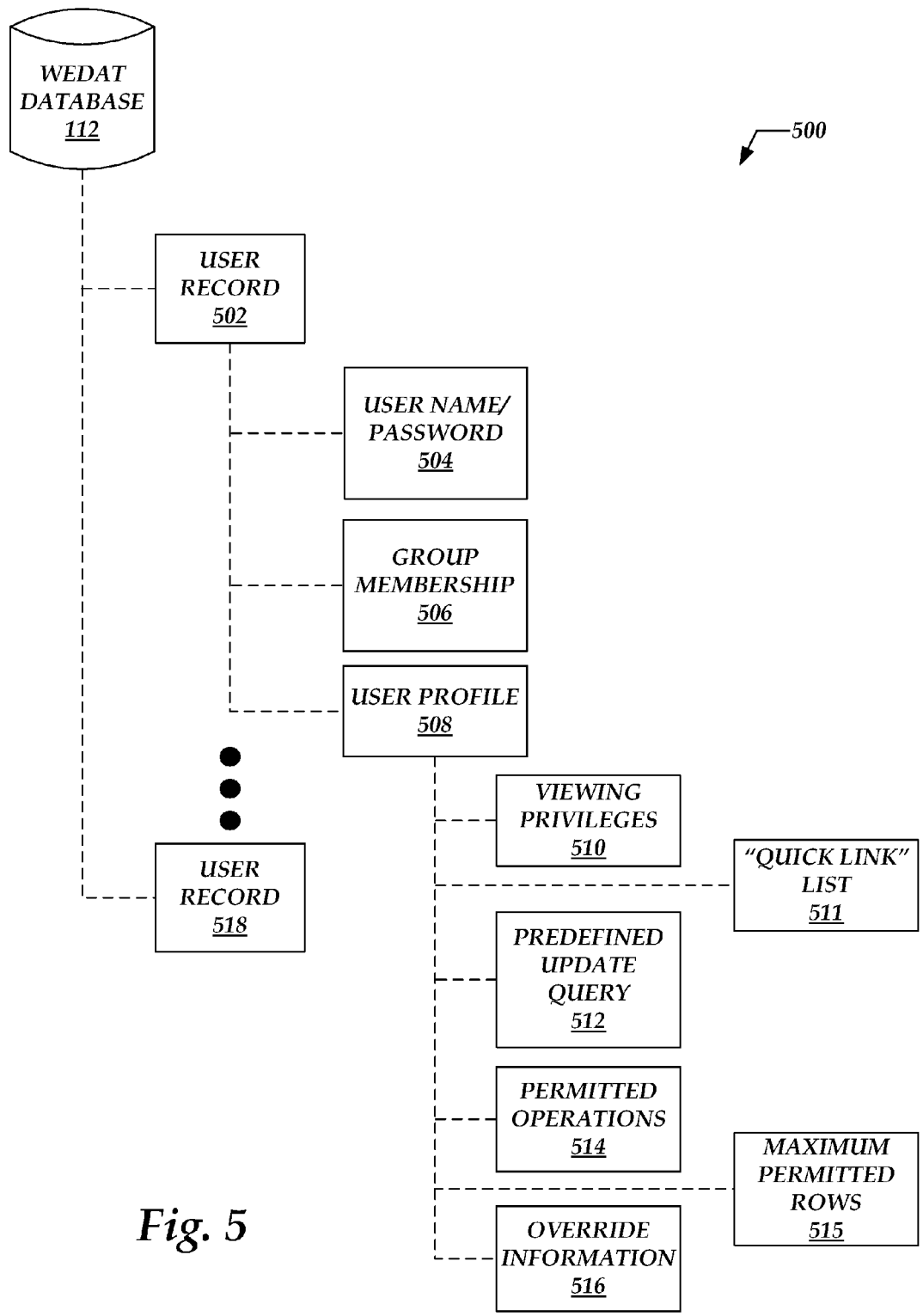
FIG. 5 is a block diagram illustrating data structures for implementing internal databases that contain user records related to the web-enabled database access tools, according to exemplary embodiments.

FIG. 5 illustrates data structures, denoted generally at 500, that may be suitable for implementing the WEDAT database. For convenience of description, but not to limit possible implementations, FIG. 5 may carry forward some items described previously, and may denote such items using identical reference numbers. For example, FIG. 5 carries forward an example of the WEDAT database, denoted at 112.

Turning to the data structures 500 in more detail, the WEDAT database 112 may include respective user records 502 that correspond to the various users 120 shown in the preceding diagrams. In example implementations, the user records 502 may include, for giving users, respective username/password combinations, denoted generally at 504. As described above in connection with FIG. 1, the users 120 may submit their username/password combination to access the WEDAT 110. However, other mechanisms for authenticating the users to the WEDAT 110 may be implemented as well.

The user record 502 may also include group membership records 506, indicating those groups in which human users are members. For example, users may be grouped by the roles that they play within a given enterprise, by the permissions that they are granted to access certain databases, and the like.

The user record 502 may include respective user profiles 508 created for any number of different users 120. The user profiles 508 may include records 510 that specify viewing privileges for different users. For example, these viewing privileges may indicate which databases a given user may access, which fields within those databases that the users may view, or the like. In this manner, the user profiles 508 may serve to protect confidential information (e.g., credit card numbers, or the like) that is stored within databases (e.g., 116) from unauthorized disclosure or access.

As represented at block 511, the user profiles 508 may include lists of "quick links" maintained respectively for different users. These quick links may be responsive to user input to take the user directly to a stored query or other screen within a database access system. In some scenarios, these quick links may be stored as a favorite within browsers associated with the different users. If the user is already logged on to the database access system, the quick links may take the user directly to the stored query or other screen. However, if the user is not already logged on to the database access system when he or she activates the quick links, the database access system may prompt the user for a user ID and password, login the user if his or her credentials are correct, and then go directly to the appropriate stored query. This process may include choosing the appropriate database against which to run the stored query (e.g., the database in use at the time that the quick link was created).

The user profiles 508 may include representations of any number of predefined update queries 512. The update queries 512 may provide mechanisms by which users may perform pre-authorized updates or other searches against particular databases (e.g., 116). In this manner, the user profile 508 may control or regulate the update queries run by particular users, thereby minimizing the risk that an inexperienced or unskilled user may inadvertently run problematic queries against the databases 116. More specifically, the update queries 512 may be pre-tested and validated for execution by particular users.

The user profiles 508 may include representations of any number of operations 514 permitted to a given user. For example, different users may be permitted to perform different types of operations, depending upon their roles, seniority, training or skill level, or other factors. More specifically, some users may be permitted only to view certain tables within databases, other users may be permitted to update tables, and the like. For example, the permitted operations parameters 514 may preclude administrators from running select operations, or from running stored or shared queries. In other examples, users having a relatively low skill level may be permitted to run only relatively basic operations (e.g., only "select" operations, or certain stored queries).

The user profiles 508 may indicate a maximum number of rows that queries executed by a given user are permitted to return, as represented generally at 515. Administrative personnel may establish for different users this maximum limit on rows that may be returned to these different users. In addition, stored queries may be associated with a maximum number of rows that may be returned in response to executing these stored queries.

Override information 516 within the user profiles 508 may specify constraints applicable to queries or other database operations performed by given users. For example, some queries—if not skillfully constructed—may return a Cartesian product. If such queries are run against, for example, a live production database within an enterprise, the enterprise may suffer negative consequences. To address such scenarios, the override information 516 may specify upper limits on the number of rows that may be returned in response to queries submitted by a given user, or may specify upper limits on the amount of processing time that may be devoted to executing such queries.

In addition, the override information 516 may be updated dynamically, in response to changing conditions affecting one or more given databases. For example, a physical hardware platform hosting the databases may be loaded more or less heavily at given times. The override information 516 may be adjusted for particular users who execute queries on this physical platform at different times.

As may be appreciated from the foregoing description, the user profiles 508 may specify on a per-user basis the various parameters represented in blocks 510-516. However, implementations of the user profiles 508 may also specify other parameters, without departing from the scope and spirit of this description.

As shown in FIG. 5, the WEDAT database 112 may include any number of user records. In addition to the user record 502 described above, the database 112 may include any number of other user records, denoted generally at 518.

Figure 6:
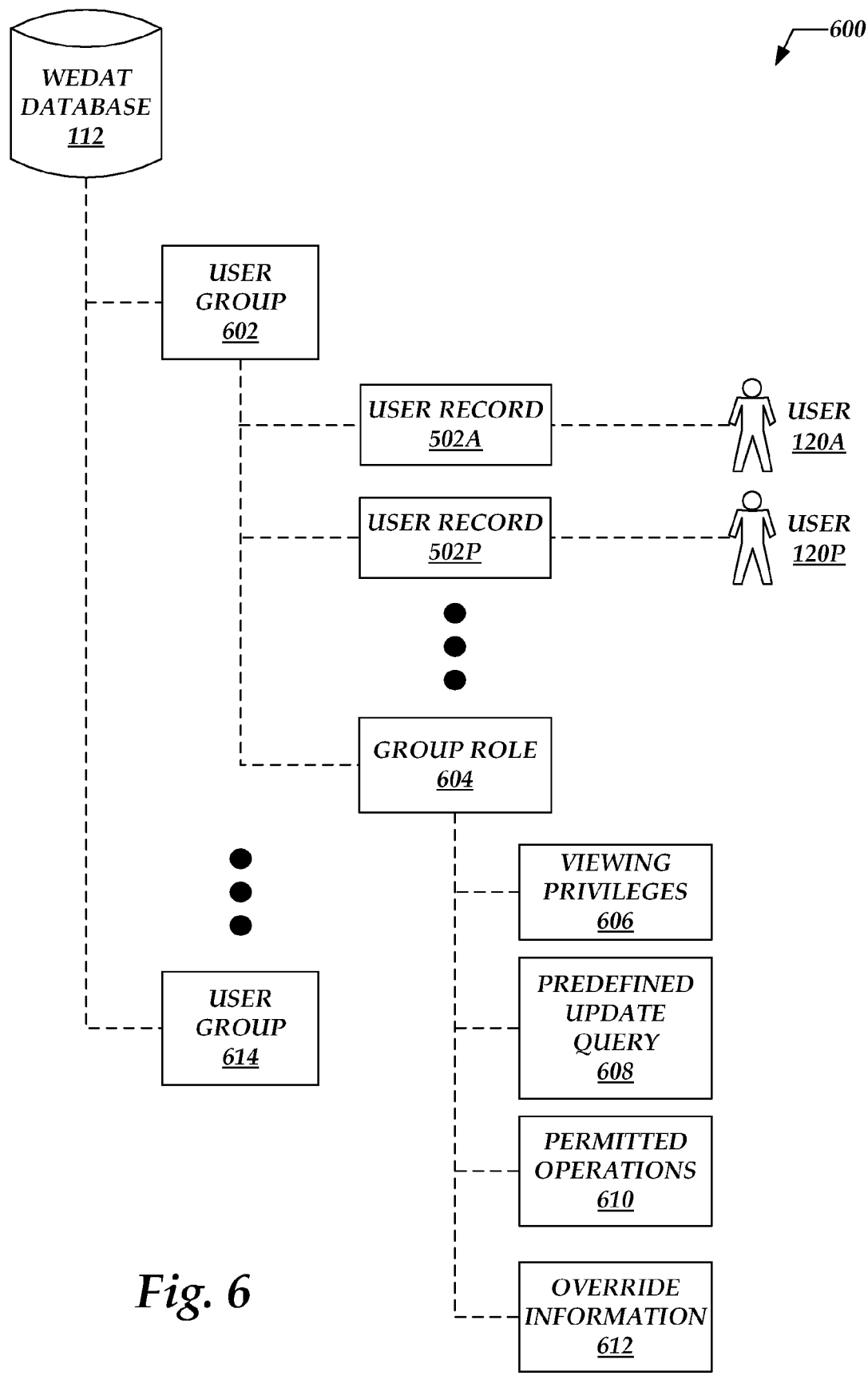
FIG. 6 is a block diagram illustrating data structures for implementing internal databases that contain representations of user groups, according to exemplary embodiments.

FIG. 6 illustrates data structures, denoted generally at 600, that may be suitable for implementing user groups within the WEDAT database. For convenience of description, but not to limit possible implementations, FIG. 6 may carry forward some items described previously, and may denote such items using identical reference numbers. For example, FIG. 6 carries forward an example of the WEDAT database, denoted at 112, and carries forward examples of users, denoted at 120a and 120p.

Turning to FIG. 6 in more detail, the WEDAT database 112 may organize any number of users 120a and 120p into groups, based on any number of factors. Accordingly, the WEDAT database 112 may include any number of user group records 602. In turn, the user group records 602 may include instances of the user records 502a and 502p, which are carried forward from FIG. 5. In the example shown, the user record 502a may correspond to the user 120a, and the user record 502p may correspond to the user 120p. In general, the user group record 602 for a given group may include a user record 502 for each user 120 is within the given group.

The user group record 602 may also be associated with a group role record 604, which defines or describes role(s) performed by the users 120 who are within a given user group 602. In addition, the group role record 604 may define, at the group level, viewing privileges 606, redefined update queries 608, permitted operations at 610, override information 612, as well as possibly other parameters not shown in FIG. 6. The description of the viewing privileges 510 in FIG. 5 applies generally to the viewing privileges 606 shown in FIG. 6, with the viewing privileges 510 being defined at the user level, rather than at the level. Similar relationships exist between the predefined update queries 512 and 608, the permitted operations 514 and 610, and the override information 516 and 612.

In general, the WEDAT database 112 may include any number of user group records 602 that define corresponding user groups. FIG. 6 also illustrates another user group record 614, with the description of the user group record 602 applying generally to the user group record 614.

Figure 7:
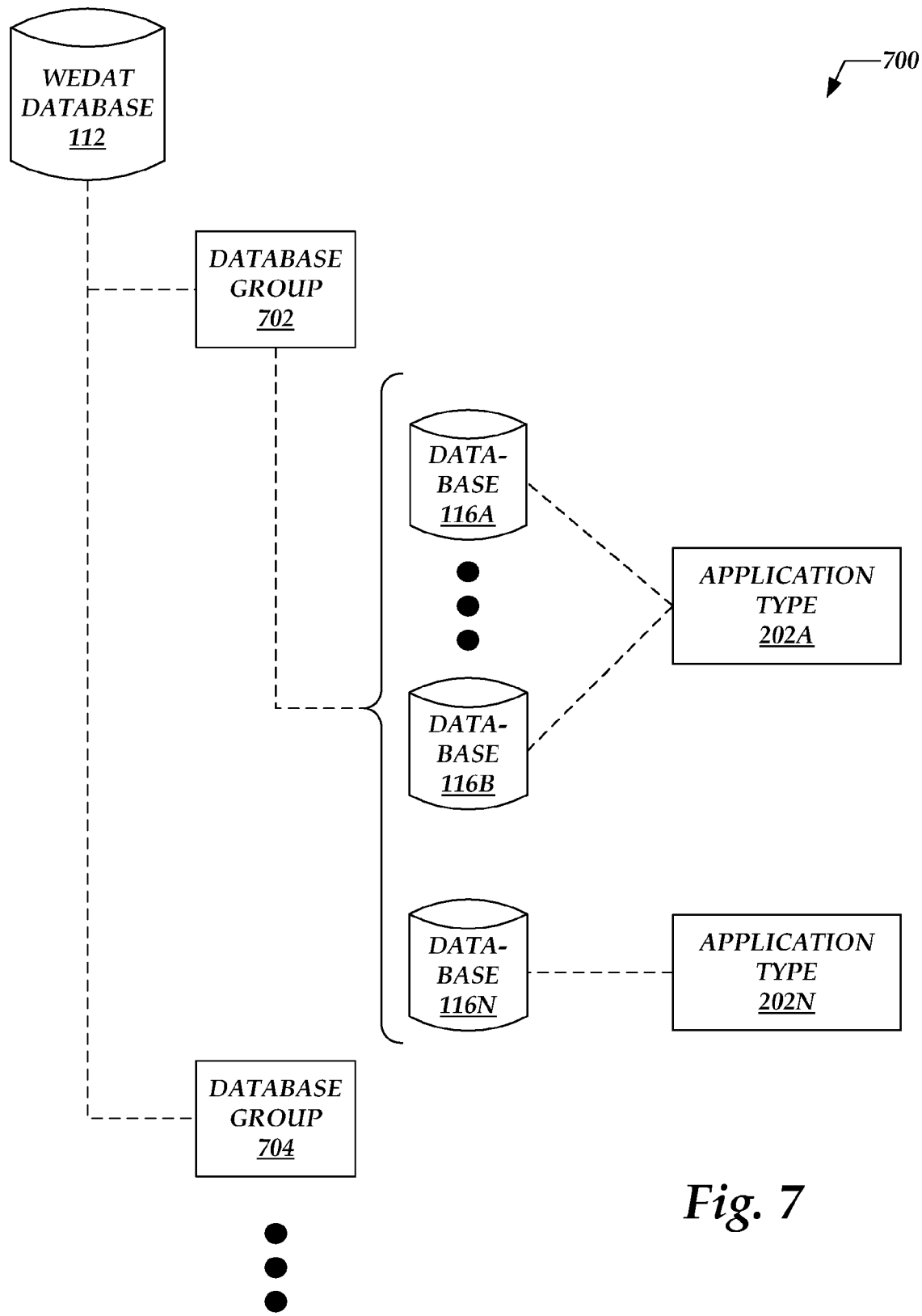
FIG. 7 is a block diagram illustrating data structures for implementing internal databases that contain representations of database groups, according to exemplary embodiments.

FIG. 7 illustrates data structures, denoted generally at 700, that may be suitable for implementing database groups within the WEDAT database. For convenience of description, but not to limit possible implementations, FIG. 7 may carry forward some items described previously, and may denote such items using identical reference numbers. For example, FIG. 7 carries forward an example of the WEDAT database, denoted at 112, and carries forward examples of external databases, denoted at 116a, 116b, and 116n (collectively, databases 116).

As shown in FIG. 7, the WEDAT database 112 may group the databases 116 using any number of database group records 702. In the example shown, the database group record 702 may include representations of the databases 116a, 116b, and 116n. The application type 202a as exposed to the users 120 may execute queries against the databases 116a and 116b, as indicated by the dashed lines connecting these blocks in FIG. 7. Another application type 202n may execute queries against the database 116n, as also indicated by the dashed lines connecting these blocks. In the foregoing manner, the WEDAT database 112 may group databases with one another, depending on which application types run queries against those databases.

In general, the WEDAT database 112 may include any number of database group records 702 that define corresponding database groups. FIG. 7 also illustrates another database group record 704, with the description of the database group record 702 applying generally to the database group record 704.

Figure 8:
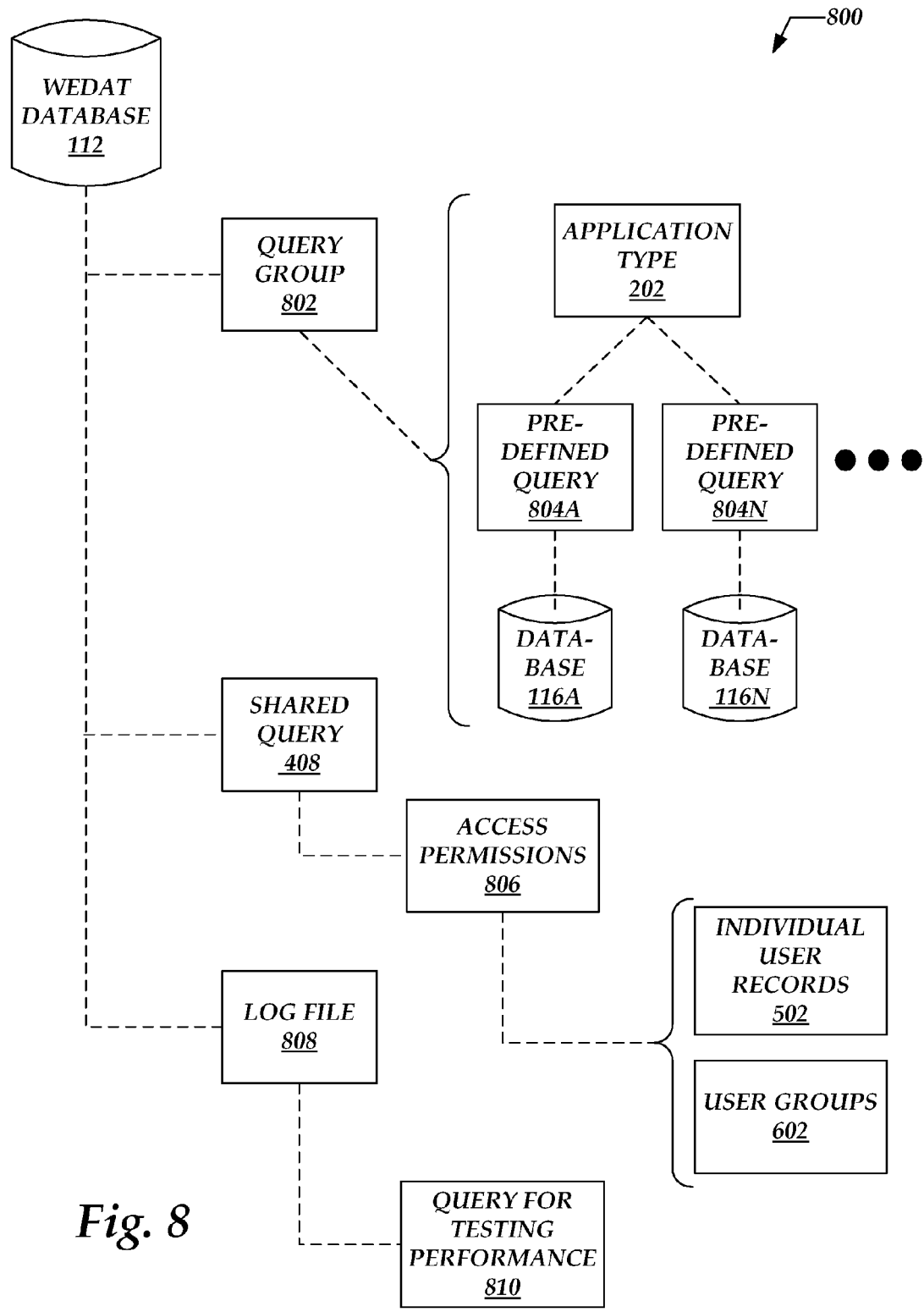
FIG. 8 is a block diagram illustrating data structures for implementing internal databases that contain representations of query groups, shared queries, and/or log files, according to exemplary embodiments.

FIG. 8 illustrates data structures, denoted generally at 800, that may be suitable for implementing query groups and log files within the WEDAT database. For convenience of description, but not to limit possible implementations, FIG. 8 may carry forward some items described previously, and may denote such items using identical reference numbers. For example, FIG. 8 carries forward an example of the WEDAT database, denoted at 112, and carries forward examples of external databases, denoted at 116a and 116n (collectively, databases 116).

Turning to FIG. 8 in more detail, the WEDAT database 112 may include any number of query group records 802, which group or associate any number of predefined queries 804a and 804n (collectively, queries 804) with one another. In the example shown, a given application type (e.g., 202) may execute queries 804 against one or more of the databases 116. In this manner, the query group record 802 may provide another level of grouping, associating queries with one another for the purposes of supporting certain application types 202.

The WEDAT database 112 may also store any number of shared queries (e.g., 408). As described above in connection with FIG. 4, the shared queries 408 may be made available for execution by different users (e.g., 120 in previous Figures). In addition, the WEDAT database 112 may associate access permissions 806 with different instances of the shared queries 408. These access permissions may specify which users are authorized to execute these shared queries. In different possible scenarios, the WEDAT database 112 may specify these access permissions on an individual-user basis, represented generally by one or more of the user records 502 (carried forward from FIG. 5). In other scenarios, the WEDAT database 112 may specify access permissions based on groups of users, as represented generally by one or more of the user group records 602 (carried forward from FIG. 6).

The WEDAT 110, operating in cooperation with the WEDAT database 112, may provide a "self administering" tool, in the sense that users having appropriate privilege levels (e.g., administrators) may configure the tool using capabilities provided by the tool itself. For example, administrators may: add users; update parameters associated with existing users; modify permissions or privilege levels; create or modify groups of users, queries, or databases; and the like.

One or more instances of log files 808 may also be stored in the WEDAT database 112 to track activities performed or associated with various users 120 as they interact with the WEDAT 110. In this manner, the log files 808 may support audits or other types of forensic analysis of previous user activity. For example, if a given database (e.g., 116 in previous Figures) crashes due to some user activity, the log files 808 may enable forensic investigation of these user activities in connection with diagnosing the crash. More specifically, the log files 808 may enable identification of a particular query run by a particular user that precipitated the database crash. Other types of forensic analysis are possible, without departing from the scope and spirit of this description.

As shown at 810 in FIG. 8, the WEDAT database 112 and related database access tools 110 may track database performance by executing a common or predefined query when different users log in. In the examples shown in FIG. 8, the WEDAT database 112 may store this tracking information in the log files 808. In addition, the WEDAT database 112 may maintain a log of how long this redefine query took to execute over the last N user logins, where N is any convenient integer. For example, if N is set to 100, the WEDAT database 112 may track how long it took the query execute over the last 100 logins.

In some implementations, the database access tools 110 may calculate and present various statistics summarizing this tracking information. For example, the database access tools 110 may calculate a simple average indicating how long it took to execute the predefined query over the last N logins. The database access tools 110 may also calculate an exponential moving average (EMA) over the last N logins, and may calculate deviations from mean on queries performed after individual logins.

Based on the foregoing, it should be appreciated that apparatus, systems, methods, and computer-readable media for web-enabled database access tools are provided herein. Although the subject matter presented herein has been described in language specific to computer structural features, methodological acts, and computer readable media, it is to be understood that the subject matter defined in the appended claims is not necessarily limited to the specific features, acts, or media described herein. Rather, the specific features, acts and mediums are disclosed as example forms of implementing the claims.

The subject matter described above is provided by way of illustration only and should not be construed as limiting. Various modifications and changes may be made to the subject matter described herein without following the example embodiments and applications illustrated and described, and without departing from the true spirit and scope of the claimed subject matter, which is set forth in the following claims.

What is claimed is:

1. A non-transitory computer-readable storage medium having computer-executable instructions stored thereon which, when executed by a computer, cause the computer to perform a method comprising:
    defining application types associated with applications supported by a database of a plurality of databases, the application types comprising tasks performed by the applications;
    associating the application types with the database and other databases of the plurality of databases;
    receiving a query associated with an application type of the application types from a first user;
    storing the query for sharing with a plurality of users;
    creating a link for accessing the query;
    storing the link in a user profile associated with a second user;
    receiving a first input from the second user selecting the link;
    in response to receiving the first input selecting the link, directing the second user to the query;
    receiving a second input from the second user for executing the query;
    executing the query on the database and the other databases of the plurality of databases associated with the application type of the application types; and
    providing a first result of the query to the second user.

2. The non-transitory computer-readable storage medium of claim 1, further comprising instructions that cause the computer perform a method comprising:
    receiving a third input selecting the query from a third user, wherein viewing privileges associated with the third user are different from viewing privileges associated with the second user;
    executing the query on a portion of the database and the other databases of the plurality of databases based on the viewing privileges of the third user; and
    providing a second result of the query to the third user.

3. The non-transitory computer-readable storage medium of claim 1, wherein the instructions for providing the first result to the second user include instructions for providing, to the second user, metadata stored within the databases.

4. The non-transitory computer-readable storage medium of claim 1, wherein the user profile specifies whether the second user is permitted to execute the query, and if the second user is permitted to execute the query, specifies a maximum number of rows that may be returned to the second user in response to executing the query.

5. The non-transitory computer-readable storage medium of claim 1, further comprising instructions that cause the computer to perform a method comprising defining a user group record corresponding to a group of users that includes the second user, wherein the user group record specifies whether members of the group may execute the query.

6. The non-transitory computer-readable storage medium of claim 1, further comprising instructions that cause the computer to perform a method comprising defining a query group record corresponding to a group of queries that includes the query, wherein the query group record specifies which users may execute queries within the group of queries.

7. A computer-implemented method comprising:
    defining application types associated with applications supported by a database of a plurality of databases, the application types comprising tasks performed by the applications;
    associating the application types with the database and other databases of the plurality of databases;

receiving a query associated with an application type of the application types from a first user;

storing the query for sharing with a plurality of users;

creating a link for accessing the query;

storing the link in a user profile associated with a second user;

receiving a first input from the second user selecting the link;

in response to receiving the first input selecting the link, directing the second user to the query;

receiving, from the second user, a second input for executing the query;

executing the query on the database and the other databases of the plurality of databases associated with the application type of the application types; and providing a first result of the query to the second user.

8. The method of claim 7, further comprising:

receiving a third input selecting the query from a third user, wherein viewing privileges associated with the third user are different from viewing privileges associated with the second user;

executing the query on a portion of the database and the other databases of the plurality of databases based on the viewing privileges of the third user; and providing a second result of the query to the third user.

* * * * *